US012142849B2

(12) United States Patent
Wei

(10) Patent No.: US 12,142,849 B2
(45) Date of Patent: Nov. 12, 2024

(54) ANTENNA STRUCTURE

(71) Applicant: Wistron NeWeb Corp., Hsinchu (TW)

(72) Inventor: Shih-Chiang Wei, Hsinchu (TW)

(73) Assignee: WISTRON NEWEB CORP., Hsinchu (TW)

(*) Notice: Subject to any disclaimer, the term of this patent is extended or adjusted under 35 U.S.C. 154(b) by 284 days.

(21) Appl. No.: 17/811,652

(22) Filed: Jul. 11, 2022

(65) Prior Publication Data

US 2023/0198149 A1 Jun. 22, 2023

(30) Foreign Application Priority Data

Dec. 17, 2021 (TW) ................................ 110147420

(51) Int. Cl.
*H01Q 5/335* (2015.01)
*H01Q 9/04* (2006.01)

(52) U.S. Cl.
CPC ........... *H01Q 9/0414* (2013.01); *H01Q 5/335* (2015.01)

(58) Field of Classification Search
CPC ........ H01Q 9/0414; H01Q 5/335; H01Q 1/22; H01Q 1/48; H01Q 1/526; H01Q 5/321; H01Q 9/285; H01Q 9/40; H01Q 5/364
See application file for complete search history.

(56) References Cited

U.S. PATENT DOCUMENTS

| | | | | |
|---|---|---|---|---|
| 2015/0145744 A1* | 5/2015 | Kao | H01Q 9/42 343/852 |
| 2016/0079656 A1* | 3/2016 | Tsai | H01Q 9/42 343/750 |
| 2017/0207542 A1* | 7/2017 | Tseng | H01Q 1/48 |
| 2020/0091595 A1* | 3/2020 | Lee | H01Q 1/22 |
| 2020/0274231 A1* | 8/2020 | Wei | H01Q 5/364 |
| 2021/0126343 A1* | 4/2021 | Chang | H01Q 5/335 |
| 2021/0167499 A1* | 6/2021 | Tseng | H01Q 5/385 |
| 2022/0013908 A1* | 1/2022 | Chang | H01Q 13/16 |

* cited by examiner

*Primary Examiner* — Hai V Tran
*Assistant Examiner* — Michael M Bouizza
(74) *Attorney, Agent, or Firm* — McClure, Qualey & Rodack, LLP

(57) ABSTRACT

An antenna structure includes a first ground element, a second ground element, a first radiation element, a second radiation element, a third radiation element, a fourth radiation element, a fifth radiation element, and a first capacitor. The first capacitor is coupled between the first radiation element and the first ground element. The second radiation element and the third radiation element are coupled to the second ground element, and are disposed adjacent to the first radiation element. The first radiation element is disposed between the second radiation element and the third radiation element. The fourth radiation element and the fifth radiation element are coupled between the first ground element and the second ground element. The first radiation element, the second radiation element, and the third radiation element are substantially surrounded by the first ground element, the second ground element, the fourth radiation element, and the fifth radiation element.

19 Claims, 6 Drawing Sheets

ANTENNA STRUCTURE

CROSS REFERENCE TO RELATED APPLICATIONS

This application claims priority of Taiwan Patent Application No. 110147420 filed on Dec. 17, 2021, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna for signal reception and transmission has insufficient bandwidth, it will degrade the communication quality of the relative mobile device. Accordingly, it has become a critical challenge for antenna designers to design a small-size, wideband antenna element.

BRIEF SUMMARY OF THE INVENTION

In an exemplary embodiment, the invention is directed to an antenna structure that includes a first ground element, a second ground element, a first radiation element, a second radiation element, a third radiation element, a fourth radiation element, a fifth radiation element, and a first capacitor. The first radiation element is coupled to a feeding point. The first capacitor is coupled between the first radiation element and the first ground element. The second radiation element is coupled to the second ground element, and is disposed adjacent to the first radiation element. The third radiation element is coupled to the second ground element, and is disposed adjacent to the first radiation element. The first radiation element is disposed between the second radiation element and the third radiation element. The fourth radiation element is coupled between the first ground element and the second ground element. The fifth radiation element is coupled between the first ground element and the second ground element. The first radiation element, the second radiation element, and the third radiation element are substantially surrounded by the first ground element, the second ground element, the fourth radiation element, and the fifth radiation element.

BRIEF DESCRIPTION OF DRAWINGS

The invention can be more fully understood by reading the subsequent detailed description and examples with references made to the accompanying drawings, wherein.

and

Figure 6:
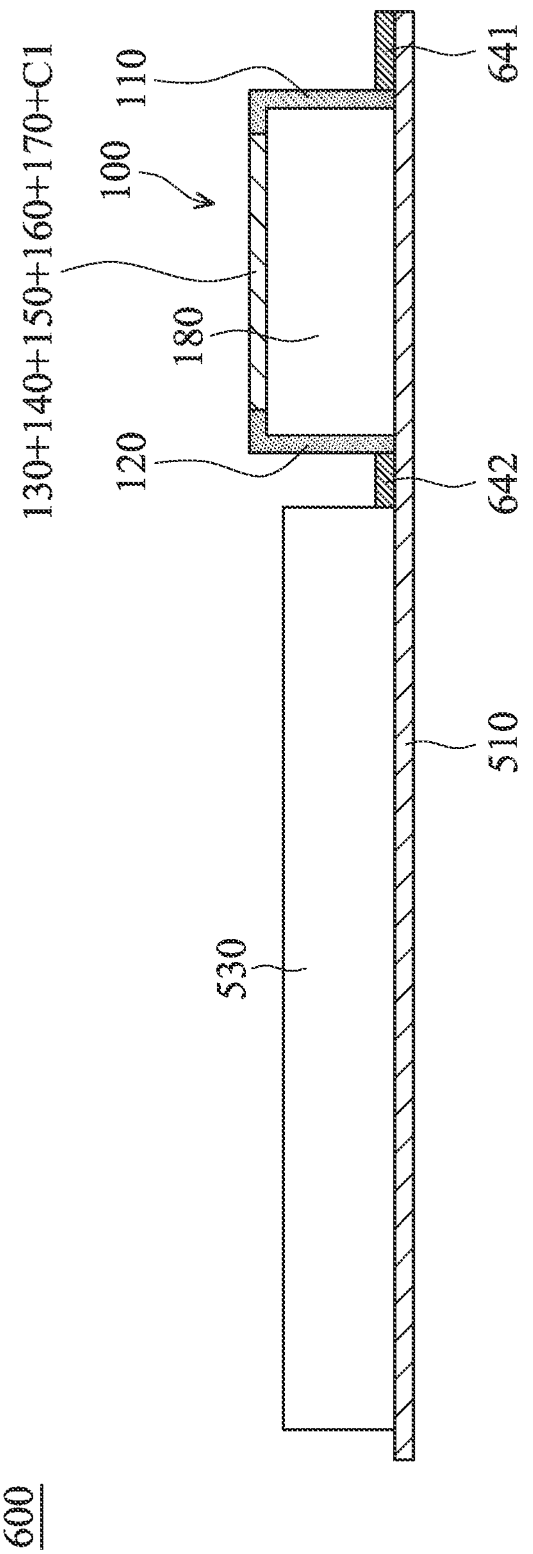

FIG. 6 is a side view of a mobile device according to an embodiment of the invention.

DETAILED DESCRIPTION OF THE INVENTION

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms “include” and “comprise” are used in an open-ended fashion, and thus should be interpreted to mean “include, but not limited to . . . ”. The term “substantially” means the value is within an acceptable error range. One skilled in the art can solve the technical problem within a predetermined error range and achieve the proposed technical performance. Also, the term “couple” is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as “beneath,” “below,” “lower,” “above,” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
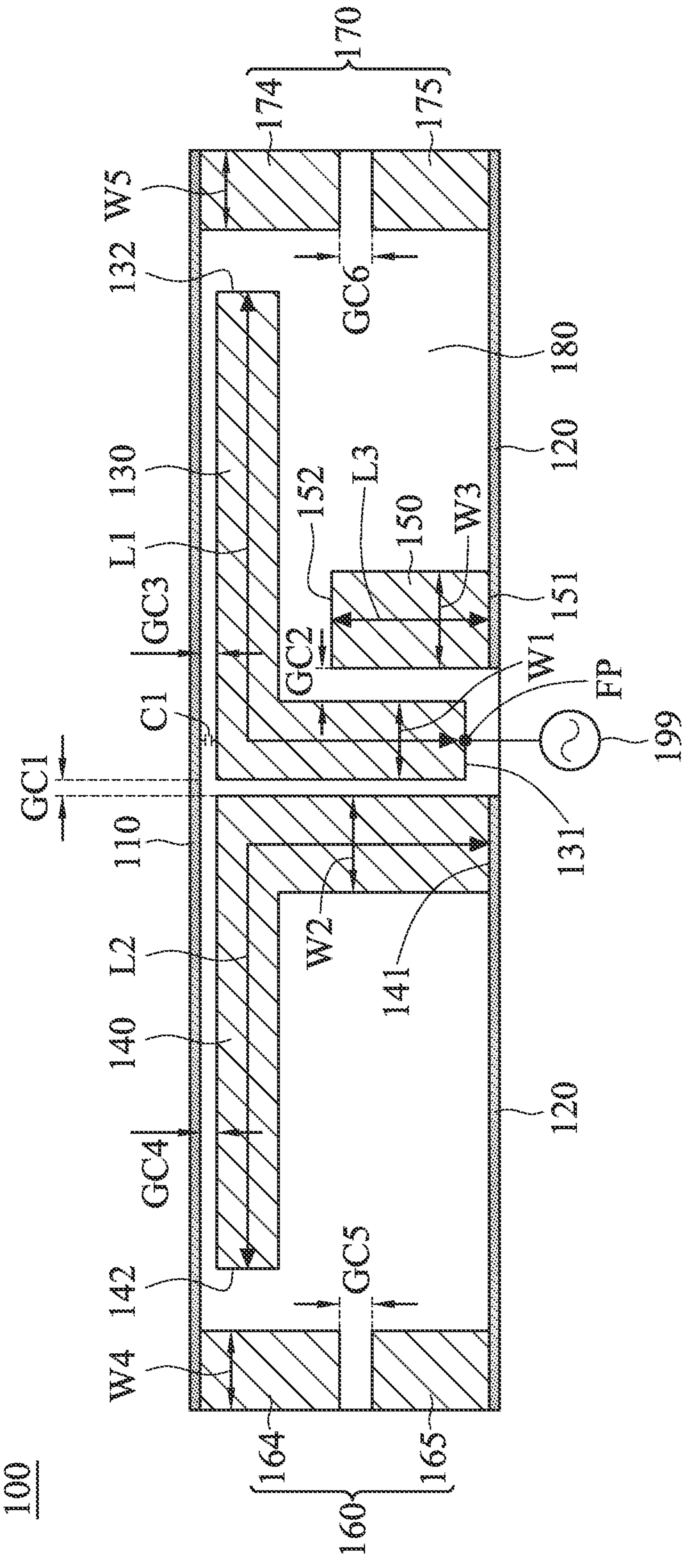
FIG. 1 is a top view of an antenna structure according to an embodiment of the invention.

FIG. 1 is a top view of an antenna structure 100 according to an embodiment of the invention. The antenna structure 100 may be applied to a mobile device, such as a smart phone, a tablet computer, or a notebook computer. In the embodiment of FIG. 1, the antenna structure 100 at least includes a first ground element 110, a second ground element 120, a first radiation element 130, a second radiation element 140, a third radiation element 150, a fourth radiation element 160, a fifth radiation element 170, and a first capacitor C1. The first ground element 110, the second ground element 120, the first radiation element 130, the second radiation element 140, the third radiation element 150, the fourth radiation element 160, and the fifth radiation element 170 may all be made of metal materials, such as copper, silver, aluminum, iron, or their alloys.

The first ground element 110 and the second ground element 120 may be positioned at a top side and a bottom side of the antenna structure 100, respectively. The first ground element 110 and the second ground element 120 may be further respectively coupled to a system ground plane or a metal housing (not shown).

The first radiation element 130 may substantially have an L-shape. Specifically, the first radiation element 130 has a first end 131 and a second end 132. A feeding point FP is positioned at the first end 131 of the first radiation element 130. The second end 132 of the first radiation element 130 is an open end. The feeding point FP may be further coupled to a signal source 199, such as an RF (Radio Frequency) module, for exciting the antenna structure 100. In addition, the first capacitor C1 is coupled between a bend portion of the first radiation element 130 and the first ground element 110.

The second radiation element 140 may substantially have an inverted L-shape. Specifically, the second radiation element 140 has a first end 141 and a second end 142. The first end 141 of the second radiation element 140 is coupled to the second ground element 120. The second end 142 of the second radiation element 140 is an open end. For example, the second end 142 of the second radiation element 140 and the second end 132 of the first radiation element 130 may substantially extend in opposite directions and away from each other. In some embodiments, the second radiation element 140 is adjacent to the first radiation element 130. A first coupling gap GC1 is formed between the second radiation element 140 and the first radiation element 130. It should be noted that the term "adjacent" or "close" over the disclosure means that the distance (spacing) between two corresponding elements is smaller than a predetermined distance (e.g., 5 mm or the shorter), but often does not mean that the two corresponding elements directly touch each other (i.e., the aforementioned distance/spacing between them is reduced to 0).

The third radiation element 150 may substantially have a straight-line shape. The first radiation element 130 is disposed between the second radiation element 140 and the third radiation element 150. Specifically, the third radiation element 150 has a first end 151 and a second end 152. The first end 151 of the third radiation element 150 is coupled to the second ground element 120. The second end 152 of the third radiation element 150 is an open end, which extends toward the first radiation element 130. In some embodiments, the third radiation element 150 is adjacent to the first radiation element 130. A second coupling gap GC2 is formed between the third radiation element 150 and the first radiation element 130.

In some embodiments, the first radiation element 130 and the second radiation element 140 are both adjacent to the first ground element 110. A third coupling gap GC3 is formed between the first radiation element 130 and the first ground element 110. A fourth coupling gap GC4 is formed between the second radiation element 140 and the first ground element 110.

The fourth radiation element 160 is coupled between the first ground element 110 and the second ground element 120. Specifically, the fourth radiation element 160 includes a first segment 164 and a second segment 165 which are adjacent to each other. The first segment 164 is coupled to the first ground element 110. The second segment 165 is coupled to the second ground element 120. In some embodiments, a fifth coupling gap GC5 is formed between the first segment 164 and the second segment 165.

The fifth radiation element 170 is coupled between the first ground element 110 and the second ground element 120. The fifth radiation element 170 may be substantially parallel to the fourth radiation element 160. Specifically, the fifth radiation element 170 includes a third segment 174 and a fourth segment 175 which are adjacent to each other. The third segment 174 is coupled to the first ground element 110. The fourth segment 175 is coupled to the second ground element 120. In some embodiments, a sixth coupling gap GC6 is formed between the third segment 174 and the fourth segment 175. It should be noted that the first radiation element 130, the second radiation element 140, the third radiation element 150, and the first capacitor C1 are substantially surrounded by the first ground element 110, the second ground element 120, the fourth radiation element 160, and the fifth radiation element 170.

In some embodiments, the antenna structure 100 further includes a nonconductive support element 180. The first ground element 110, the second ground element 120, the first radiation element 130, the second radiation element 140, the third radiation element 150, the fourth radiation element 160, the fifth radiation element 170, and the first capacitor C1 are all disposed on the nonconductive support element 180. The shape and type of the nonconductive support element 180 are not limited in the invention. In alternative embodiments, the nonconductive support element 180 is replaced by a PCB (Printed Circuit Board) or an FPC (Flexible Printed Circuit).

Figure 2:
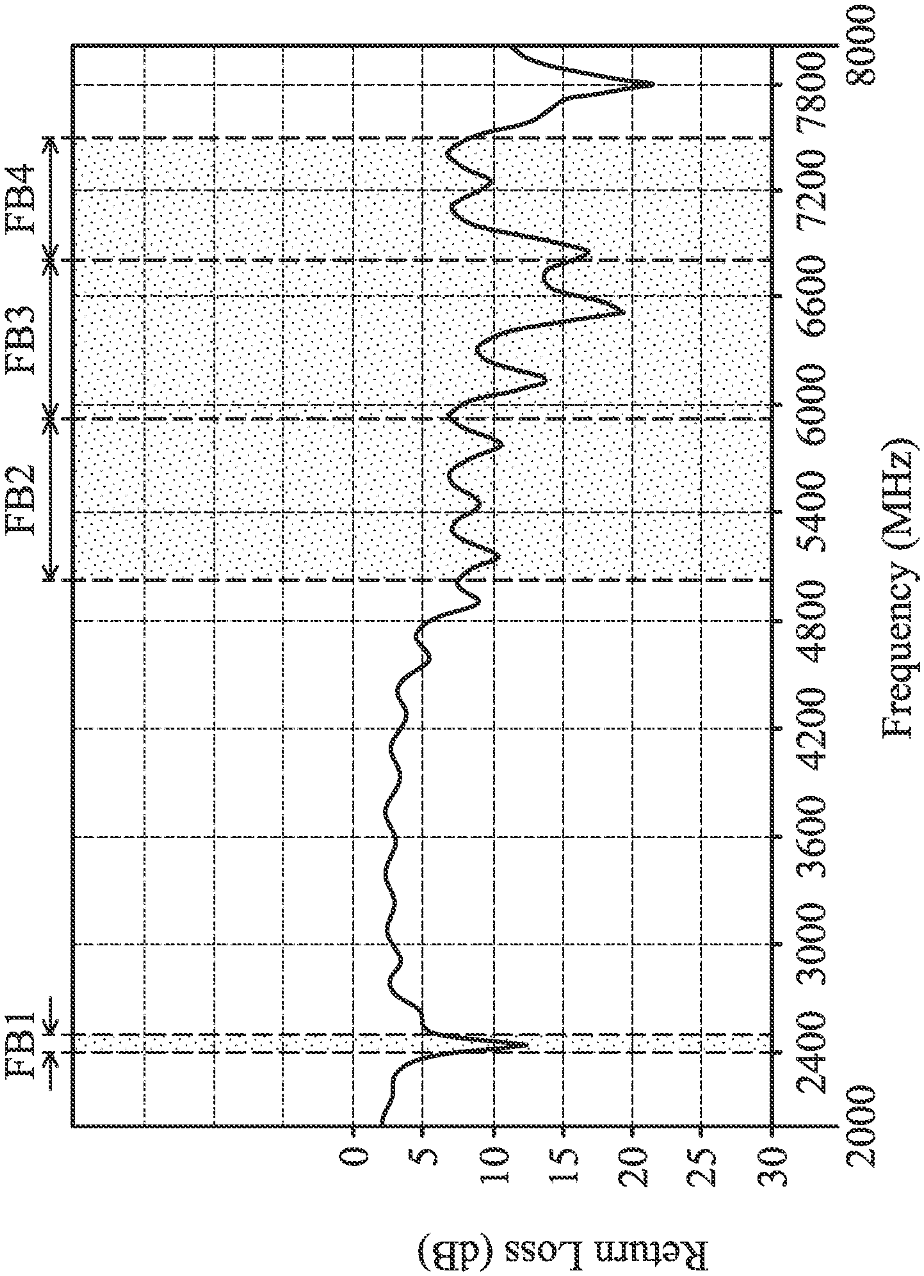
FIG. 2 is a diagram of return loss of an antenna structure according to an embodiment of the invention.

FIG. 2 is a diagram of return loss of the antenna structure 100 according to an embodiment of the invention. The horizontal axis represents the operational frequency (MHz), and the vertical axis represents the return loss (dB). According to the measurement of FIG. 2, the antenna structure 100 can at least cover a first frequency band FB1, a second frequency band FB2, a third frequency band FB3, and a fourth frequency band FB4. For example, the first frequency band FB1 may be from 2400 MHz to 2500 MHz, the second frequency band FB2 may be from 5000 MHz to 5900 MHz, the third frequency band FB3 may be from 5900 MHz to 6800 MHz, and the fourth frequency band FB4 may be from 6800 MHz to 7500 MHz. Accordingly, the antenna structure 100 can support at least the wideband operations of conventional WLAN (Wireless Local Area Network) and the next-generation Wi-Fi 6E.

In some embodiments, the operational principles of the antenna structure 100 will be described as follows. The second radiation element 140 is excited by the first radiation element 130 using a coupling mechanism, and they are used together with the fourth radiation element 160 and the fifth radiation element 170, so as to form the first frequency band FB1. The first radiation element 130, the second radiation element 140, the fourth radiation element 160, and the fifth radiation element 170 are configured to adjust the impedance matching and the resonant frequency shift of the first frequency band FB1. The third radiation element 150 is excited by the first radiation element 130 using a coupling mechanism, so as to form the second frequency band FB2. In addition, the first radiation element 130 and the second radiation element 140 are further excited to generate some higher-order resonant modes, so as to form the third frequency band FB3 and the fourth frequency band FB4. According to practical measurements, the incorporation of the first capacitor C1 can help to improve the impedance matching of the second frequency band FB2, the third frequency band FB3, and the fourth frequency band FB4, thereby increasing the operational bandwidth thereof.

In some embodiments, the element sizes and parameters of the antenna structure 100 will be described as follows. The length L1 of the first radiation element 130 may be longer than or equal to 0.125 wavelength (λ/8) of the first frequency band FB1 of the antenna structure 100. The length L2 of the second radiation element 140 may be longer than or equal to 0.125 wavelength (λ/8) of the first frequency band FB1 of the antenna structure 100. The length L3 of the third radiation element 150 may be longer than or equal to 0.125 wavelength (λ/8) of the second frequency band FB2 of the antenna structure 100. The width W1 of the first radiation element 130, the width W2 of the second radiation element 140, the width W3 of the third radiation element 150, the width W4 of the fourth radiation element 160, and the width W5 of the fifth radiation element 170 may all be longer than or equal to 1 mm. The width of each of the first coupling gap GC1, the second coupling gap GC2, the third coupling gap GC3, the fourth coupling gap GC4, the fifth coupling gap GC5, and the sixth coupling gap GC6 may be shorter than or equal to 3 mm. In some embodiments, each of the aforementioned coupling gaps GC1 to GC6 substantially has a variable-width shape (e.g., a Z-shape or a W-shape). The width of at least any portion of each of the aforementioned coupling gaps GC1 to GC6 may be shorter than or equal to 3 mm. The capacitance of the first capacitor C1 may be from 2 pF to 6.8 pF, such as about 3.3 pF. The above ranges of element sizes and parameters are calculated and obtained according to many experiment results, and they help to optimize the operational bandwidth and impedance matching of the antenna structure 100.

The following embodiments will introduce other configurations of the antenna structure 100, which can provide similar performance. It should be understood that these figures and descriptions are merely exemplary, rather than limitations of the invention.

Figure 3:
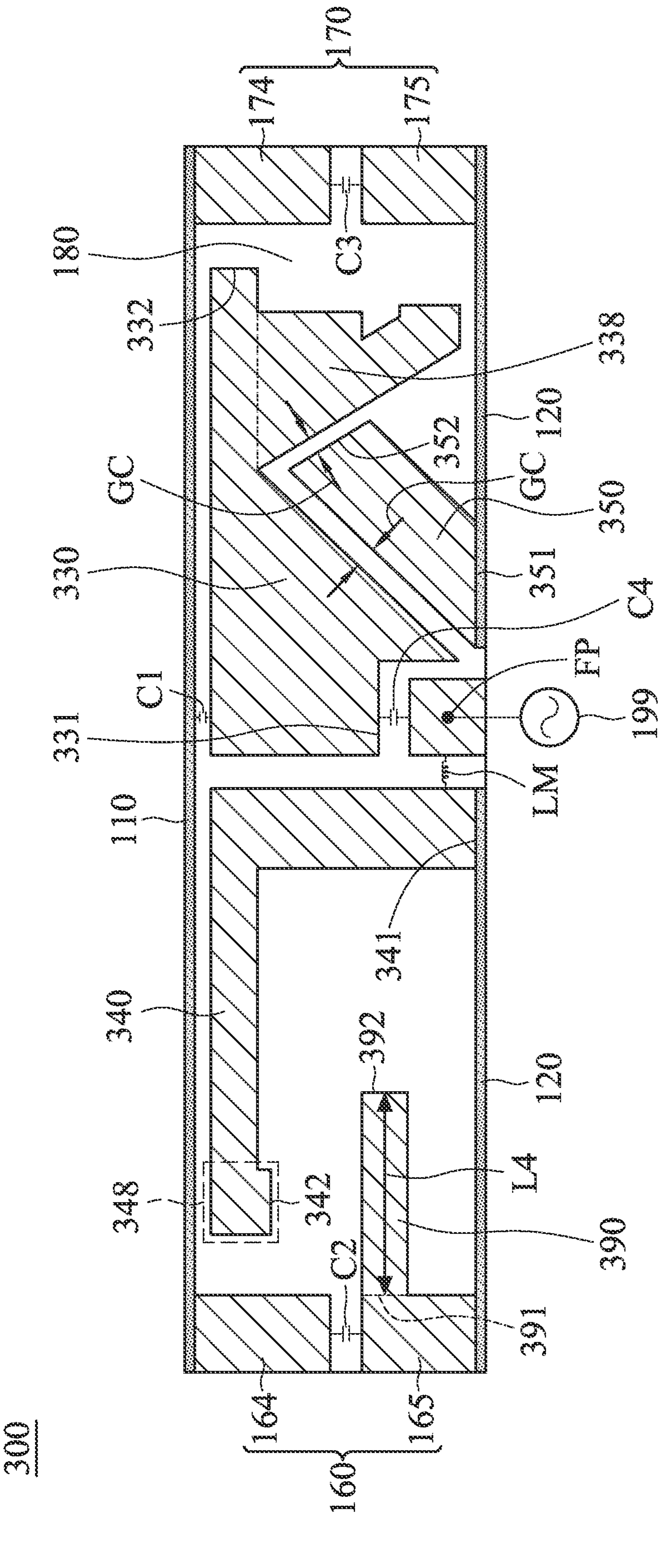
FIG. 3 is a top view of an antenna structure according to an embodiment of the invention.

FIG. 3 is a top view of an antenna structure 300 according to an embodiment of the invention. FIG. 3 is similar to FIG. 1. In the embodiment of FIG. 3, the antenna structure 300 further includes a sixth radiation element 390, a second capacitor C2, a third capacitor C3, a fourth capacitor C4, and an inductor LM, which may all be disposed on the nonconductive support element 180. Furthermore, a first radiation element 330, a second radiation element 340, and a third radiation element 350 of the antenna structure 300 are designed and slightly adjusted.

In the fourth radiation element 160, the second capacitor C2 is coupled in series between the first segment 164 and the second segment 165, and the aforementioned fifth coupling gap GC5 is replaced with the second capacitor C2. In the fifth radiation element 170, the third capacitor C3 is coupled in series between the third segment 174 and the fourth segment 175, and the aforementioned sixth coupling gap GC6 is replaced with the third capacitor C3. The sixth radiation element 390 may substantially have a straight-line shape, and it may be substantially parallel to the first ground element 110 and the second ground element 120. Specifically, the sixth radiation element 390 has a first end 391 and a second end 392. The first end 391 of the sixth radiation element 390 is coupled to the second segment 165 of the fourth radiation element 160. The second end 392 of the sixth radiation element 390 is an open end, which extends toward the second radiation element 340.

The first radiation element 330 may substantially have a variable-width shape. Specifically, the first radiation element 330 has a first end 331 and a second end 332. The fourth capacitor C4 is coupled between the feeding point FP and the first end 331 of the first radiation element 330. In some embodiments, the first radiation element 330 further includes a terminal extension portion 338, which is adjacent to the second end 332 of the first radiation element 330. For example, the terminal extension portion 338 of the first radiation element 330 may substantially have an inverted triangular shape, which may extend toward the second ground element 120.

The second radiation element 340 may substantially have an inverted L-shape. Specifically, the second radiation element 340 has a first end 341 and a second end 342. The first end 341 of the second radiation element 340 is coupled to the second ground element 120. The inductor LM is coupled between the feeding point FP and the first end 341 of the second radiation element 340. In some embodiments, the second radiation element 340 further includes a terminal bend portion 348, which is adjacent to the second end 342 of the second radiation element 340.

The third radiation element 350 may substantially have a trapezoidal shape. Specifically, the third radiation element 350 has a first end 351 and a second end 352. The first end 351 of the third radiation element 350 is coupled to the second ground element 120. The second end 352 of the third radiation element 350 is an open end, which extends toward the terminal extension portion 338 of the first radiation element 330. In some embodiments, a coupling gap GC is formed between the third radiation element 350 and the terminal extension portion 338 of the first radiation element 330. The width of the coupling gap GC may be shorter than or equal to 3 mm. In alternative embodiments, the coupling gap GC substantially has a variable-width shape (e.g., a Z-shape or a W-shape). The width of at least any portion of the coupling gap GC may be shorter than or equal to 3 mm.

Figure 4:
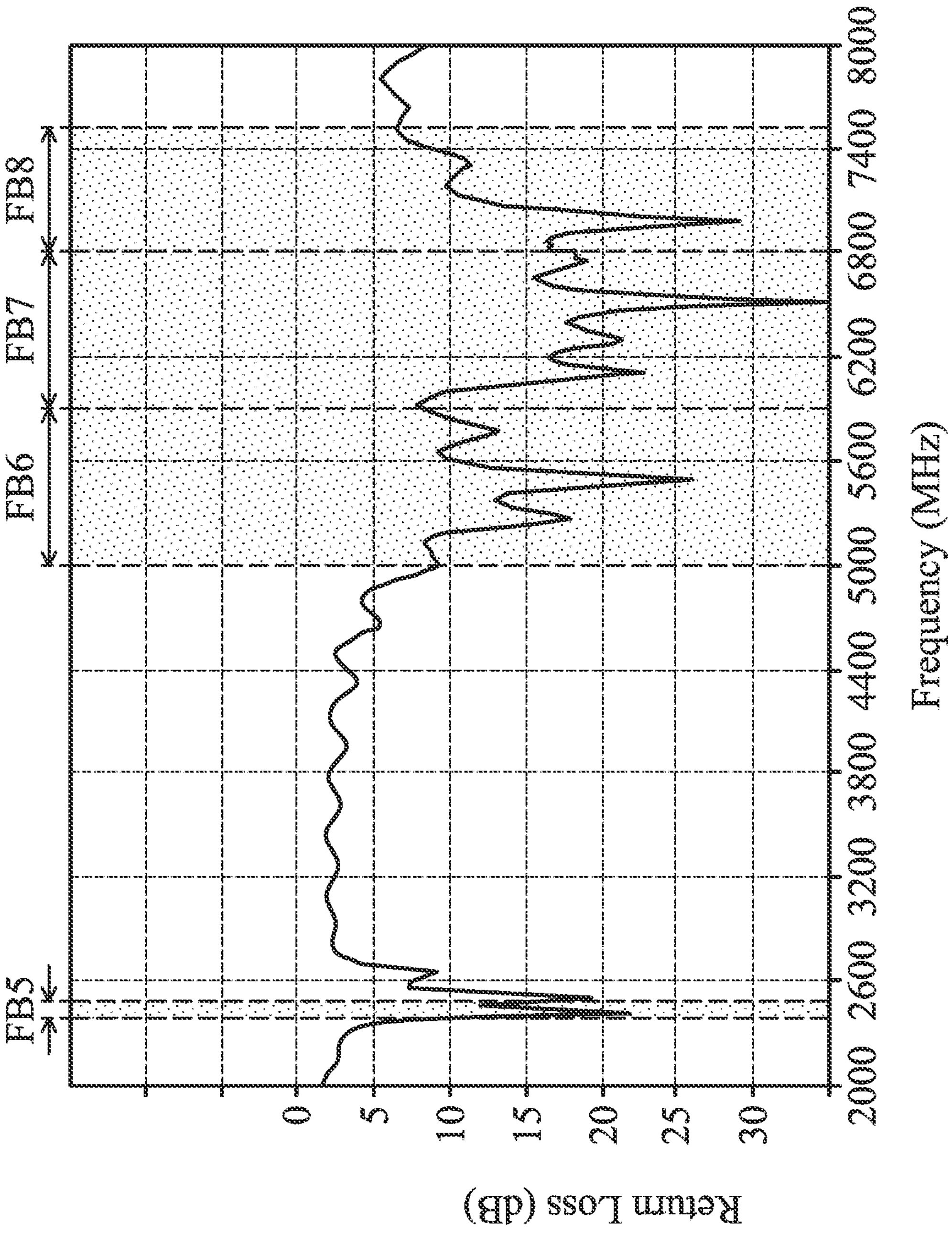
FIG. 4 is a diagram of return loss of an antenna structure according to an embodiment of the invention.

FIG. 4 is a diagram of return loss of the antenna structure 300 according to an embodiment of the invention. The horizontal axis represents the operational frequency (MHz), and the vertical axis represents the return loss (dB). According to the measurement of FIG. 4, the antenna structure 300 can at least cover a first frequency band FB5, a second frequency band FB6, a third frequency band FB7, and a fourth frequency band FB8. For example, the first frequency band FB5 may be from 2400 MHz to 2500 MHz, the second frequency band FB6 may be from 5000 MHz to 5900 MHz, the third frequency band FB7 may be from 5900 MHz to 6800 MHz, and the fourth frequency band FB8 may be from 6800 MHz to 7500 MHz. Accordingly, the antenna structure 300 can also support at least the wideband operations of conventional WLAN and the next-generation Wi-Fi 6E.

In some embodiments, the element sizes and parameters of the antenna structure 300 will be described as follows. The length L4 of the sixth radiation element 390 may be longer than or equal to 0.125 wavelength (λ/8) of the fourth frequency band FB8 of the antenna structure 300. The capacitance of the second capacitor C2 may be from 0.1 pF to 1 pF, such as about 0.4 pF. The capacitance of the third capacitor C3 may be from 0.1 pF to 1 pF, such as about 0.4 pF. The capacitance of the fourth capacitor C4 may be from 2 pF to 6 pF, such as about 3.6 pF. The inductance of the inductor LM may be from 4 nH to 10 nH, such as about 6.2 nH. It should be noted that according to practical measurements, the above design can help to further optimize the operational bandwidth and impedance matching of the antenna structure 300. Other features of the antenna structure 300 of FIG. 3 are similar to those of the antenna structure 100 of FIG. 1. Therefore, the two embodiments can achieve similar levels of performance.

Figure 5:
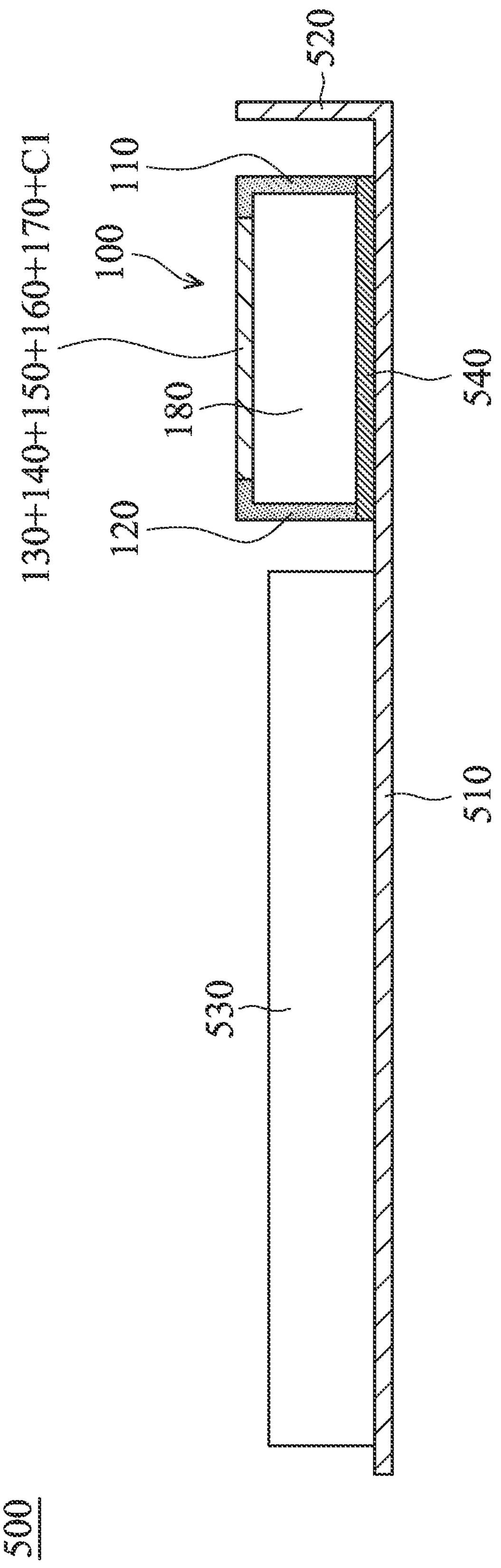
FIG. 5 is a side view of a mobile device according to an embodiment of the invention.

FIG. 5 is a side view of a antenna structure 500 according to an embodiment of the invention. In the embodiment of FIG. 5, the antenna structure 500 further includes a metal back cover 510, a metal sidewall 520, a display device 530, a conductive buffer element 540, and an antenna structure 100 as mentioned above. The metal sidewall 520 is coupled to the metal back cover 510, and is substantially perpendicular to the metal back cover 510. The antenna structure 100 is disposed between the metal sidewall 520 and the display device 530. For example, the conductive buffer element 540 may be a gasket or a conductive foam, which may be positioned at the bottom of the nonconductive support element 180. In addition, the first ground element 110 and the second ground element 120 are respectively coupled to the conductive buffer element 540 and the metal back cover 510. According to practical measurements, the antenna structure 100 is well integrated with the other components of the antenna structure 500, and even if the antenna structure 100 is adjacent to an environment with a metal housing, the antenna structure 100 can still provide good radiation characteristics. In other embodiments, the first ground element 110 and the second ground element 120 further extend and connect to each other at the bottom of the nonconductive support element 180. Next, the first ground element 110 and the second ground element 120 are coupled through the conductive buffer element 540 to the metal back cover 510.

FIG. 6 is a side view of a antenna structure 600 according to an embodiment of the invention. FIG. 6 is similar to FIG. 5. In the embodiment of FIG. 6, the antenna structure 600 further includes a first conductive buffer element 641 and a second conductive buffer element 642 (replacing the aforementioned conductive buffer element 540), which are positioned at two sides of the nonconductive support element 180, respectively. In addition, the first ground element 110 is coupled through the first conductive buffer element 641 to the metal back cover 510, and the second ground element 120 is coupled through the second conductive buffer element 642 to the metal back cover 510. The metal sidewall 520 is merely an optional component, which is removable from the antenna structure 600 in other embodiments. Other features of the antenna structure 600 of FIG. 6 are similar to those of the antenna structure 500 of FIG. 5. Therefore, the two embodiments can achieve similar levels of performance.

The invention proposes a novel antenna structure. In comparison to the conventional design, the invention has at least the advantages of small size, wide bandwidth, low manufacturing cost, and application in different environments. Therefore, the invention is suitable for application in a variety of mobile communication devices.

Note that the above element sizes, element shapes, and frequency ranges are not limitations of the invention. An antenna designer can fine-tune these settings or values according to different requirements. It should be understood that the antenna structure of the invention is not limited to the configurations of FIGS. 1-6. The invention may merely include any one or more features of any one or more embodiments of FIGS. 1-6. In other words, not all of the features displayed in the figures should be implemented in the antenna structure of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:
- a first ground element;
- a second ground element;
- a first radiation element, coupled to a feeding point;
- a first capacitor, coupled between the first radiation element and the first ground element;
- a second radiation element, coupled to the second ground element, and disposed adjacent to the first radiation element;
- a third radiation element, coupled to the second ground element, and disposed adjacent to the first radiation element, wherein the first radiation element is disposed between the second radiation element and the third radiation element;
- a fourth radiation element, coupled between the first ground element and the second ground element; and
- a fifth radiation element, coupled between the first ground element and the second ground element;
- wherein the first radiation element, the second radiation element, and the third radiation element are substantially surrounded by the first ground element, the second ground element, the fourth radiation element, and the fifth radiation element;
- wherein the fourth radiation element comprises a first segment and a second segment disposed adjacent to each other, the first segment is coupled to the first ground element, and the second segment is coupled to the second ground element.

2. The antenna structure as claimed in claim 1, wherein the first radiation element substantially has an L-shape or a variable-width shape.

3. The antenna structure as claimed in claim 1, wherein the first radiation element further comprises a terminal extension portion, and the second radiation element further comprises a terminal bend portion.

4. The antenna structure as claimed in claim 1, wherein the second radiation element substantially has an inverted L-shape.

5. The antenna structure as claimed in claim 1, wherein the third radiation element substantially has a straight-line shape.

6. The antenna structure as claimed in claim 1, wherein a first coupling gap is formed between the second radiation element and the first radiation element, a second coupling gap is formed between the third radiation element and the first radiation element, and a width of at least any portion of each of the first coupling gap and the second coupling gap is shorter than or equal to 3 mm.

7. The antenna structure as claimed in claim 1, wherein a third coupling gap is formed between the first radiation element and the first ground element, a fourth coupling gap is formed between the second radiation element and the first ground element, and a width of at least any portion of each of the third coupling gap and the fourth coupling gap is shorter than or equal to 3 mm.

8. The antenna structure as claimed in claim 1, further comprising:

a second capacitor, coupled in series between the first segment and the second segment.

9. The antenna structure as claimed in claim 1, further comprising:

a sixth radiation element, coupled to the second segment, wherein the sixth radiation element is substantially parallel to the first ground element and the second ground element.

10. The antenna structure as claimed in claim 9, further comprising:

a nonconductive support element, wherein the first ground element, the second ground element, the first radiation element, the second radiation element, the third radiation element, the fourth radiation element, the fifth radiation element, and the sixth radiation element are disposed on the nonconductive support element.

11. The antenna structure as claimed in claim 1, wherein the fifth radiation element comprises a third segment and a fourth segment disposed adjacent to each other, the third segment is coupled to the first ground element, and the fourth segment is coupled to the second ground element.

12. The antenna structure as claimed in claim 11, further comprising:

a third capacitor, coupled in series between the third segment and the fourth segment.

13. The antenna structure as claimed in claim 1, further comprising:

a fourth capacitor, coupled between the feeding point and the first radiation element.

14. The antenna structure as claimed in claim 1, further comprising:

an inductor, coupled between the feeding point and the second radiation element.

15. The antenna structure as claimed in claim 1, wherein the antenna structure covers a first frequency band, a second frequency band, a third frequency band, and a fourth frequency band.

16. The antenna structure as claimed in claim 15, wherein the first frequency band is from 2400 MHz to 2500 MHz, the second frequency band is from 5000 MHz to 5900 MHZ, the third frequency band is from 5900 MHz to 6800 MHZ, and the fourth frequency band is from 6800 MHz to 7500 MHz.

17. The antenna structure as claimed in claim 15, wherein a length of the first radiation element is longer than or equal to 0.125 wavelength of the first frequency band.

18. The antenna structure as claimed in claim 15, wherein a length of the second radiation element is longer than or equal to 0.125 wavelength of the first frequency band.

19. The antenna structure as claimed in claim 15, wherein a length of the third radiation element is longer than or equal to 0.125 wavelength of the second frequency band.

* * * * *